US009310745B2

(12) United States Patent
Kobayashi et al.

(10) Patent No.: US 9,310,745 B2
(45) Date of Patent: Apr. 12, 2016

(54) IMAGE FORMING APPARATUS, NON-TRANSITORY COMPUTER READABLE MEDIUM, AND IMAGE FORMING METHOD OF SWITCHING AN ORIENTATION OF A RECORDING MEDIUM

(71) Applicant: FUJI XEROX CO., LTD., Tokyo (JP)

(72) Inventors: Jota Kobayashi, Yokohama (JP); Yasutaka Goto, Yokohama (JP); Koji Okabe, Yokohama (JP); Yuki Kubota, Yokohama (JP); Takayuki Ryu, Yokohama (JP); Kenji Sawai, Ebina (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/151,210

(22) Filed: Jan. 9, 2014

(65) Prior Publication Data

US 2014/0355018 A1 Dec. 4, 2014

(30) Foreign Application Priority Data

Jun. 3, 2013 (JP) ................................. 2013-117272

(51) Int. Cl.
*G06K 15/00* (2006.01)
*G03G 15/00* (2006.01)

(52) U.S. Cl.
CPC .... *G03G 15/602* (2013.01); *G03G 2215/00603* (2013.01); *G03G 2215/00755* (2013.01)

(58) Field of Classification Search
None
See application file for complete search history.

(56) References Cited

FOREIGN PATENT DOCUMENTS

| | | | |
|---|---|---|---|
| JP | 2007065421 A | * | 3/2007 |
| JP | A-2007-065421 | | 3/2007 |
| JP | A-2011-112708 | | 6/2011 |

* cited by examiner

*Primary Examiner* — King Poon
*Assistant Examiner* — Andrew H Lam
(74) *Attorney, Agent, or Firm* — Oliff PLC

(57) ABSTRACT

An image forming apparatus includes a rotating fixing unit, a switching unit, and a control unit. The rotating fixing unit has a surface, the surface fixing a toner image on a recording medium by contacting the recording medium. The switching unit switches between transportation directions in which the recording sheet is transported such that an orientation of a predetermined side of the recording medium with respect to the fixing unit matches either an orientation corresponding to a first direction in which the central axis of the fixing unit extends or an orientation corresponding to a second direction that is perpendicular to the first direction. The control unit controls the switching unit such that the recording medium is transported in a direction corresponding to a smaller one of integration values obtained along the first direction and the second direction.

12 Claims, 11 Drawing Sheets

IMAGE FORMING APPARATUS, NON-TRANSITORY COMPUTER READABLE MEDIUM, AND IMAGE FORMING METHOD OF SWITCHING AN ORIENTATION OF A RECORDING MEDIUM

CROSS-REFERENCE TO RELATED APPLICATIONS

This application is based on and claims priority under 35 USC 119 from Japanese Patent Application No. 2013-117272 filed Jun. 3, 2013.

BACKGROUND

Technical Field

The present invention relates to an image forming apparatus, a non-transitory computer readable medium, and an image forming method.

SUMMARY

According to an aspect of the invention, there is provided an image forming apparatus including a rotating fixing unit, a switching unit, and a control unit. The rotating fixing unit has a surface, the surface fixing a toner image on a recording medium, which is being transported, by contacting the recording medium. The switching unit switches between transportation directions in which the recording sheet is transported such that an orientation of a predetermined side of the recording medium with respect to the fixing unit matches either an orientation corresponding to a first direction in which the central axis of the fixing unit extends or an orientation corresponding to a second direction that is perpendicular to the first direction. The control unit controls the switching unit such that the recording medium is transported in a direction corresponding to a smaller one of integration values obtained along the first direction and the second direction, the integration values being integration values of an area of a portion of the surface of the rotating fixing unit that first contacts a toner image when fixing is performed.

BRIEF DESCRIPTION OF THE DRAWINGS

Exemplary embodiments of the present invention will be described in detail based on the following figures, wherein.

DETAILED DESCRIPTION

In the following, details of an image forming apparatus 10 according to exemplary embodiments will be described with reference to the drawings.

First Exemplary Embodiment

Figure 1:
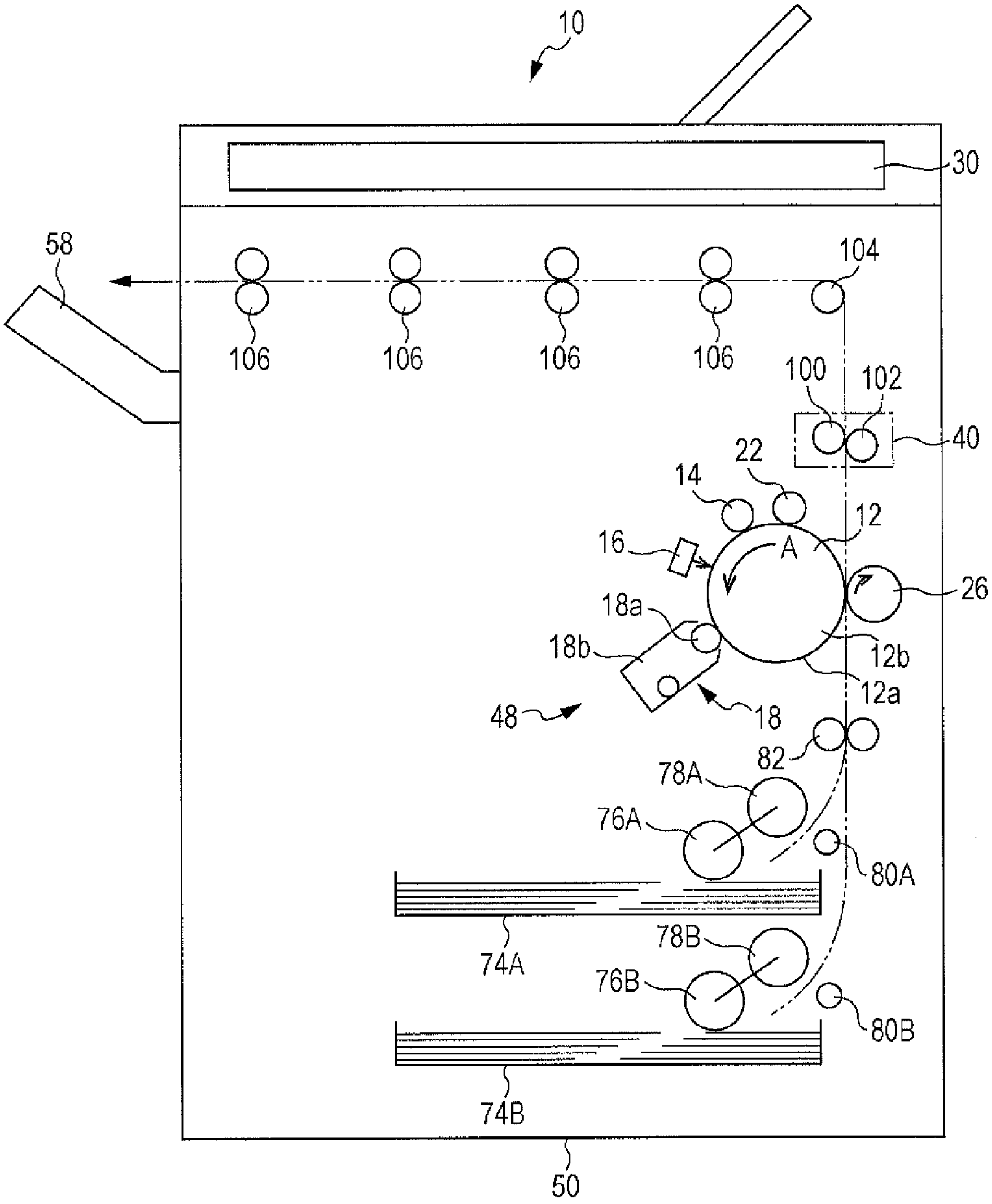
FIG. 1 is a cross-sectional side view illustrating an example of the structure of an image forming apparatus according to an exemplary embodiment.

FIG. 1 is a cross-sectional side view illustrating the structure of a main part of the image forming apparatus 10 according to a first exemplary embodiment. As illustrated in FIG. 1, the image forming apparatus 10 includes an image forming unit 48, sheet trays 74A and 74B (hereinafter simply referred to as "sheet trays 74" when the sheet trays 74A and 74B are collectively called), a scanner unit 30, and the like housed in a housing 50.

Recording sheets serving as recording mediums are stacked in the sheet trays 74A and 74B. The orientation of sheets in the sheet tray 74A differs from the orientation of sheets in the sheet tray 74B by 90°. The image forming apparatus 10 is equipped with feeding rollers 76A and 76B (hereinafter simply referred to as "feeding rollers 76" when the feeding rollers 76A and 76B are collectively called) at positions corresponding to the positions at which the sheet trays 74A and 74B are loaded. The feeding rollers 76A and 76B are arranged in a rotatable manner at ends of arms, the other ends of which are arranged in a rotatable manner. On a side of the other ends of the arms, rollers 78A and 78B (hereinafter simply referred to as "rollers 78" when the rollers 78A and 78B are collectively called) and rollers 80A and 80B (hereinafter simply referred to as "rollers 80" when the rollers 80A and 80B are collectively called) are provided, the rollers 80A and 80B being arranged so as to correspond to the rollers 78A and 78B, respectively. The rotation center of each of the rollers 78A and 78B and the rotation center of a corresponding one of the arms are coaxially arranged.

Here, the orientations of recording sheets stacked in the sheet trays 74A and 74B are, for example as follows. In the sheet tray 74A, the long side of recording sheets extends in a direction the same as a direction in which the rotation axis of a fixing roller 100, which will be described later, extends. In the sheet tray 74B, the short side of recording sheets extends in a direction the same as the direction in which the rotation axis of the fixing roller 100 extends. In the following, the sheet tray 74A may also be called "Landscape Tray" and the sheet tray 74B may also be called "Portrait Tray".

In FIG. 1, transport paths of recording sheets are drawn with an imaginary line (a dash-dot-dot line) and a pair of rollers 82 is arranged along these transport paths. When feeding of a recording sheet is instructed, a feeding roller 76 corresponding to the instruction moves downward and rotates while contacting the upper most recording sheet, thereby feeding a recording sheet. The fed recording sheet is guided by rollers 78 and 80 corresponding to the feeding roller 76, sandwiched by the pair of rollers 82 arranged downstream of the roller 80 in a sheet transportation direction, and transported to the image forming unit 48.

The image forming unit 48 according to the first exemplary embodiment includes a photoconductive drum 12, a charging roller 14, a latent-image forming device 16, a developing device 18, a transfer roller 26, and a charge removing and cleaning device 22.

The photoconductive drum 12 includes a photoconductive film 12*a* and a base material 12*b*. The photoconductive film 12*a* is provided at a peripheral surface of the photoconductive drum 12 and includes an electric-charge transport layer and an electric-charge generating layer. The base material 12*b* supports the photoconductive film 12*a* and is composed of aluminum or the like. In addition, the photoconductive drum 12 is rotated by a motor (not illustrated) at a predetermined rotation speed in an A direction illustrated with an arc-shaped arrow, the A direction serving as a sub-scanning direction.

The charging roller 14 is provided on the peripheral surface of the photoconductive drum 12 such that the charging roller 14 contacts the peripheral surface of the photoconductive drum 12, the charging roller 14 charging the peripheral surface of the photoconductive drum 12. Note that, in the image forming apparatus 10 according to the first exemplary embodiment, the charging roller 14, which is a contact-type charging device, is used; however a charging device is not limited this. A non-contact-type charging device such as a scorotron charging device or a corotron charging device may also be used.

The charging roller 14 is a conductive roller and is rotatable to follow the rotation of the photoconductive drum 12. In addition, a voltage obtained by superimposing an alternating voltage and a direct-current voltage is applied to the charging roller 14 from a power source for charging (not illustrated). As a result, the charging roller 14 uniformly charges the peripheral surface of the photoconductive drum 12 to a predetermined potential.

The latent-image forming device 16 is arranged downstream of the charging roller 14 in the A direction of the photoconductive drum 12 represented by the arc-shaped arrow. The latent-image forming device 16 modulates, for example, a beam emitted from a laser light source in accordance with an image to be formed, deflects the modulated beam in a main scanning direction, and performs scanning with the modulated beam on the peripheral surface of the photoconductive drum 12 in a direction parallel to the central axis of the photoconductive drum 12. As a result, an electrostatic latent image is formed on the peripheral surface of the photoconductive drum 12.

The developing device 18 is arranged downstream of the latent-image forming device 16 in the A direction of the photoconductive drum 12 represented by the arc-shaped arrow. A container unit 18*b* is provided in the developing device 18. The container unit 18*b* contains toner as a charged developer. A developing roller 18*a* provided in the developing device 18 develops, using the toner, an electrostatic latent image formed on the surface of the photoconductive drum 12.

Specifically, the developing roller 18*a* is charged to a predetermined developing potential, and toner charged by a potential difference between the photoconductive drum 12 and the developing roller 18*a* is supplied to a section of the photoconductive drum 12, the section being a section where an electrostatic latent image is formed. The supplied toner is adhered to the electrostatic latent image by an electrostatic force and a toner image is formed.

The transfer roller 26 contacts the photoconductive drum 12 and is arranged downstream of the developing device 18 in the A direction of the photoconductive drum 12 represented by the arc-shaped arrow. A recording sheet transported to an arrangement position of the transfer roller 26 by the pair of rollers 82 is pressed by the transfer roller 26 against the photoconductive drum 12. Thus, the toner image formed on the peripheral surface of photoconductive drum 12 is transferred onto a printing surface of the recording sheet.

After a toner image formed on the peripheral surface of the photoconductive drum 12 has been transferred onto a recording sheet, the peripheral surface of the photoconductive drum 12 is cleaned by the charge removing and cleaning device 22.

In contrast, a fixing device 40 is arranged above the transfer roller 26 (on a downstream side in the sheet transportation direction). The fixing device 40 includes the fixing roller 100 and a roller 102. The fixing roller 100 heats a toner image on a recording sheet. The roller 102 is pressed against the fixing roller 100. When a recording sheet onto which a toner image has been transferred passes through a nip part (a contacting part) between the fixing roller 100 and the roller 102, the toner image on the recording sheet melts. Then, the toner image is solidified and fixed on a printing surface of the recording sheet. The resulting recording sheet after fixing is transported to an arrangement position of a guiding roller 104.

A recording sheet transported to the arrangement position of the guiding roller 104 is guided by plural pairs of rollers 106, and discharged on a sheet discharging unit 58 provided on a side surface of the housing 50. Here, the sheet transportation direction is changed by almost 90° when viewed from the fixing roller 100, and thus the recording sheet is stacked on the sheet discharging unit 58 such that an image printing surface of the recording paper faces downward.

In addition, the scanner unit 30 includes a reading mechanism that reads an image on a document or the like, the reading mechanism being not illustrated. The scanner unit 30 drives the reading mechanism and acquires, as digital image data, a piece of image information representing an image on a document or the like.

Figure 2:
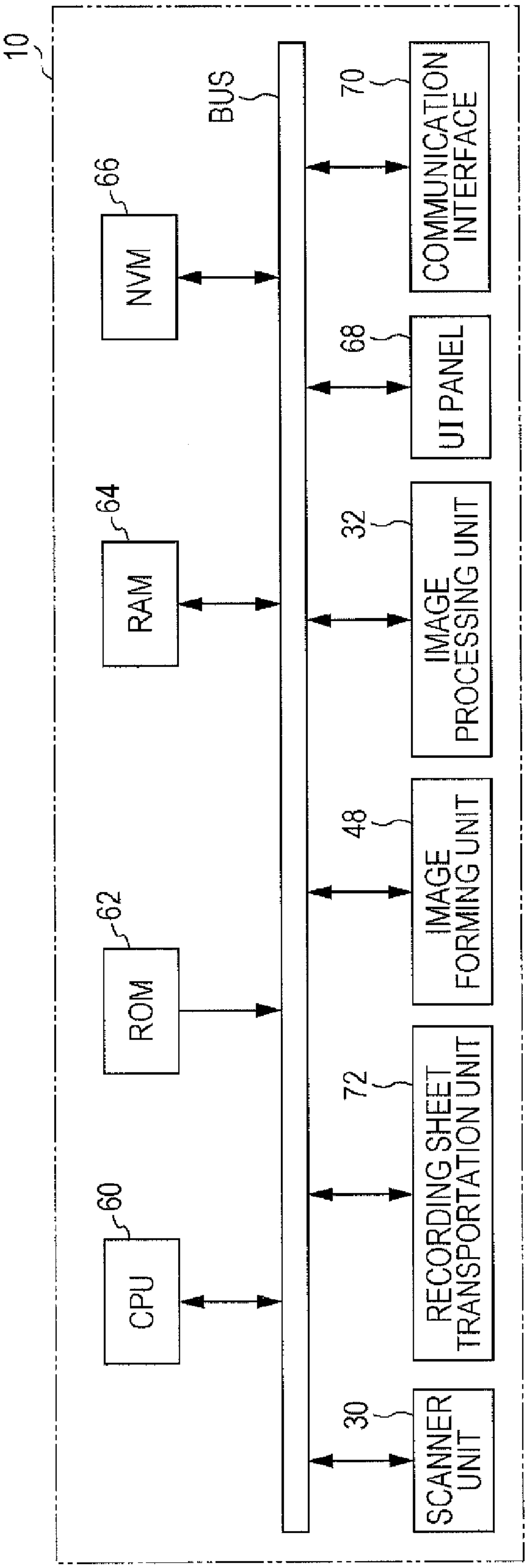
FIG. 2 is a block diagram illustrating an example of the structure of a main part of an electrical system of the image forming apparatus according to the exemplary embodiment.

FIG. 2 is a block diagram illustrating a main part of an electrical system of the image forming apparatus 10 according to the first exemplary embodiment. As illustrated in FIG. 2, the image forming apparatus 10 includes a central processing unit (CPU) 60, a read-only memory (ROM) 62, a random-access memory (RAM) 64, a nonvolatile memory (NVM) 66, a user interface (UI) panel 68, and a communication interface 70.

The CPU 60 has control over the entire image forming apparatus 10. The ROM 62 functions as a storage unit that stores a control program used to control operation of the image forming apparatus 10, an image forming processing program, which will be described later, various parameters, and the like. The RAM 64 is used as a work area or the like when a program or programs of various kinds are being executed. The NVM 66 stores various kinds of information that need to be held even after the image forming apparatus 10 is switched off.

The UI panel 68 includes a touch panel display or the like, the touch panel display being obtained by disposing a transmissive touch panel on a display. Various kinds of information are displayed on a display surface of the UI panel 68 and also a user may input desired information or a desired instruction by touching the touch panel.

The communication interface 70 is, for example, connected to a terminal apparatus (not illustrated) such as a personal computer. The communication interface 70 is an interface for receiving, from a terminal apparatus, various kinds of information such as image information representing an image to be formed on a recording sheet or, in contrast, for transmitting, to a terminal apparatus, various kinds of information such as image information obtained by performing scanning in the image forming apparatus 10.

The CPU 60, the ROM 62, the RAM 64, the NVM 66, the UI panel 68, and the communication interface 70 are connected to one another via a system bus BUS. Thus, the CPU 60 accesses the ROM 62, the RAM 64, and the NVM 66, causes the UI panel 68 to display various kinds of information, understands the content of an operation instruction input by a user through the UI panel 68, receives various kinds of information from a terminal apparatus via the communication interface 70, and transmits various kinds of information to a terminal apparatus via the communication interface 70.

The image forming apparatus 10 further includes the image forming unit 48, a recording sheet transportation unit 72, the scanner unit 30, and an image processing unit 32.

The image forming unit 48 includes the photoconductive drum 12, the charging roller 14, the latent-image forming device 16, the developing device 18, the transfer roller 26, the charge removing and cleaning device 22, and the fixing device 40, which have been described above, and certain rollers and a motor (not illustrated) that drives rollers. The image forming unit 48 forms an image on a recording sheet using a Xerography method, that is, performs printing.

In addition, the recording sheet transportation unit 72 includes the sheet trays 74, the feeding rollers 76, the rollers 78 and 80, the pair of rollers 82, the guiding roller 104, and the pairs of rollers 106. The recording sheet transportation unit 72 transports recording sheets in the image forming apparatus 10.

The scanner unit 30 is a unit that acquires, as a piece of image information, an image on a document or the like as described above.

In addition, the image processing unit 32 performs, for example, image processing on a piece of image information acquired using the scanner unit 30 or the like, generates data for printing, or stores an acquired piece of image information in a storage device or the like, which is not illustrated.

The image forming unit 48, the recording sheet transportation unit 72, the scanner unit 30, and the image processing unit 32 are also connected to the system bus BUS. Thus, the CPU 60 also controls operation of the image forming unit 48, the recording sheet transportation unit 72, the scanner unit 30, and the image processing unit 32.

Here, the flow of image forming processing in the image forming unit 48 is as follows.

When the peripheral surface of the photoconductive drum 12 is charged by the charging roller 14 and the photoconductive drum 12 is driven and starts rotating, an electrostatic latent image is formed on the photoconductive drum 12 by the latent-image forming device 16. Then, toner is supplied to the electrostatic latent image by the developing device 18. As a result, the electrostatic latent image is rendered visible and becomes a toner image. The toner image is transported by the photoconductive drum 12 to a position that is in contact with the transfer roller 26.

Power is supplied to the transfer roller 26 by a power supply for transfer (not illustrated), and a recording sheet is pressed against the peripheral surface of the photoconductive drum 12 by the transfer roller 26. As a result, a toner image on the photoconductive drum 12 is transferred onto a printing surface of the recording sheet. The recording sheet on which the toner image has been transferred is transported to the fixing device 40, and the toner image is fixed on the recording sheet by the fixing device 40.

In the fixing device 40, as described above, the fixing roller 100 or the like is heated to fix toner on a recording sheet. Volatile organic compounds (hereinafter may be referred to as "VOCs") or ultra-fine particles may be generated from heated toner or the like by heating. As interest in environment issues has been growing in recent years, a decrease in VOCs is especially desirable also in the image forming apparatus 10.

In contrast, as described above, in the fixing device 40, toner is fixed on a recording medium by pressing the fixing roller 100 against the roller 102 and by sandwiching and transporting the recording sheet on which a toner image has been formed between the fixing roller 100 and the roller 102. A certain amount of toner on the recording sheet is adhered to the fixing roller 100 and stays behind. In this case, the smaller the amount of toner contacting the fixing roller 100, the smaller the amount of VOCs generated.

Here, as demand for downsizing and power-saving of the image forming apparatus 10 increases, the shape of the fixing roller 100 becomes smaller. For example, the fixing roller 100 has a diameter of 25 mmϕ. Thus, the circumference of the fixing roller 100 in a rotation direction is about 80 mm. Thus, the circumference of the fixing roller 100 is generally shorter than a longitudinal length of and a lateral length of a recording sheet (for example, an A4-size sheet has a size of 210 mm×297 mm, which are longitudinal and lateral lengths).

Consequently, in the case where fixing is performed by the fixing roller 100 on a recording sheet on which a toner image has been formed, after contacting toner at the first rotation, the fixing roller 100 may contact toner in an accumulating manner at the second and third rotations. In this case, the amount of toner staying behind at the first rotation as a result of contacting is dominant in a portion where toner is accumulated, and the amount of toner staying behind at the second and subsequent rotations as a result of contacting is small. That is, even when the same toner image is used, the smaller the size of an area of the toner image contacting the peripheral surface of the fixing roller 100 as the fixing roller 100 rotates, that is, the larger the size of an area of toner images contacting each other, the smaller the amount of toner that stays behind.

In the image forming apparatus 10 according to the first exemplary embodiment, the orientation of a recording sheet transported to the fixing roller 100 is selected in accordance with the above-described knowledge, and consequently the amount of toner contacting the fixing roller 100 as the fixing roller 100 rotates is reduced. As a result, the amount of toner staying behind on the fixing roller 100 is reduced and generation of VOCs and the like due to heating the toner is suppressed.

Next, with reference to FIGS. 3A to 8B, contacting states of the fixing roller 100 and toner images on a recording sheet will be described and a method for determining the orientation of a recording sheet with respect to the fixing roller 100 will also be described, in the orientation the size of an area of the toner images contacting the fixing roller 100 being smaller.

Figures 3A, 3B, 3C, 3D, 3E, 3F:
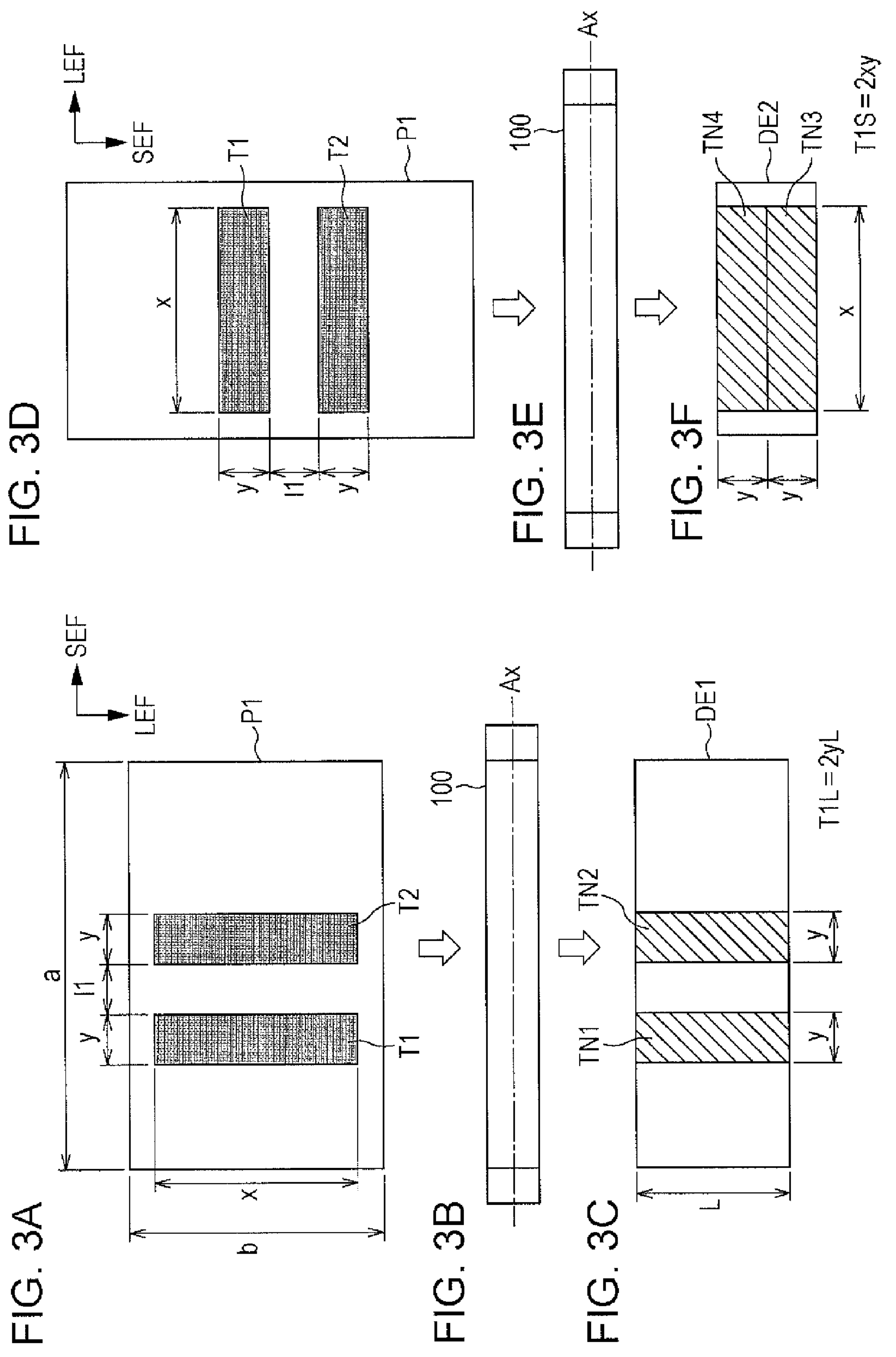
FIGS. 3A to 3F are plan views illustrating an example of a contact state of a fixing roller and toner images according to a first exemplary embodiment.

FIG. 3A illustrates a recording sheet P1 having lengthwise and widthwise dimensions of a and b, respectively. On the recording sheet P1, toner images T1 and T2 are formed. In FIG. 3A, the toner images T1 and T2 each have a rectangular shape, the length of which in the direction of the shorter side of the recording sheet P1 is x and the length of which in the direction of the longer side of the recording sheet P1 is y. The toner images T1 and T2 are arranged and spaced apart from each other by a distance l1.

Note that all recording sheets in the following description have lengthwise and widthwise dimensions of a and b, respectively, to avoid confusion.

FIG. 3B illustrates the fixing roller 100, which has a rotation axis AX. In addition, FIG. 3C illustrates a portion where a toner image on the recording sheet P1 has contacted the fixing roller 100 on an expansion plan DE1 of the peripheral surface of the fixing roller 100 in the case where the recording sheet P1 is transported in the orientation illustrated in FIG. 3A to the fixing roller 100 arranged in a direction illustrated in FIG. 3B.

Here, suppose that the circumference of the fixing roller 100 is L and 2L>x>L. In addition, a transportation direction in the case where the recording sheet P1 is transported such that the direction of the longer side of the recording sheet P1 matches a direction in which the rotation axis of the fixing roller 100 extends is referred to as a LEF direction. A transportation direction in the case where the recording sheet P1 is transported such that the direction of the shorter side of the recording sheet P1 matches a direction in which the rotation axis of the fixing roller 100 extends is referred to as a SEF direction.

In FIG. 3C, portions where the toner images T1 and T2 contact the fixing roller 100 are illustrated as contact portions TN1 and TN2 on the expansion plan DE1 of the fixing roller 100. The width of the contact portions TN1 and TN2 is y and the length is L. This is because contact portions at the second and subsequent rotations overlap a contact portion at the first rotation of the fixing roller 100. In this case, a total contact area T1L is T1L=2yL.

FIGS. 3D to 3F illustrate a case where the recording sheet P1 is transported in the SEF direction with respect to the fixing roller 100. FIG. 3D illustrates a state of the recording sheet P1 including the orientation of the recording sheet P1. FIG. 3E illustrates the fixing roller 100, which is the same as that in FIG. 3B. FIG. 3F illustrates contact portions TN3 and TN4 where the toner images T1 and T2 have contacted the fixing roller 100 on an expansion plan DE2 of the fixing roller 100. The contact portions TN3 and TN4 each have a rectangular shape having a width of y and a length of x. The contact portions TN3 and TN4 are arranged next to each other. That is, the distance l1 between the toner images T1 and T2 is set to a distance such that the toner images T1 and T2 become adjacent to each other when the fixing roller 100 performs one rotation, in association with the circumference L of the fixing roller 100.

In the case illustrated in FIG. 3F, a total contact area T1S is T1S=2xy.

From a result described above, T1L<T1S is obtained on the assumption 2L>x>L described above. Thus, for the recording sheet P1 having the toner images T1 and T2, it is clear that a total contact area varies depending on the orientation of the recording sheet P1 in the transportation direction with respect to the fixing roller 100. In the case illustrated in FIG. 3, with regard to suppressing of generation of VOCs, it is clear that the recording sheet P1 is preferably transported such that the recording sheet P1 has an orientation corresponding to the LEF direction in which the total contact area becomes smaller.

In the first exemplary embodiment, a method in which, for each orientation of a recording sheet, an integration image value is obtained by integrating pieces of image information in a direction corresponding to the orientation is used to determine an orientation of the recording sheet in which a total contact area becomes smaller. A recording sheet is transported in a direction corresponding to a smaller integration image value is obtained, with respect to the fixing roller 100.

Next, with reference to FIGS. 4A to 5B, a specific method for calculating integration image values according to the first exemplary embodiment will be described.

Figure 4A:
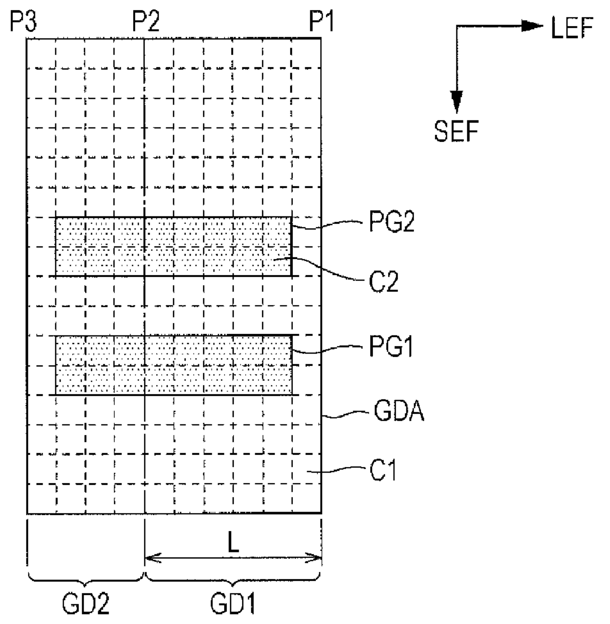
FIGS. 4A and 4B are schematic diagrams illustrating a method for calculating an integration image value in the direction of the longer side of a recording sheet in the case of an image illustrated in FIGS. 3A to 3F.

FIG. 4A illustrates a piece of image information GDA of an image to be printed on a recording sheet arranged in an orientation corresponding to the LEF direction with respect to the fixing roller 100. The piece of image information GDA corresponds to the recording sheet P1 in FIG. 3A, and pieces of image information PG1 and PG2 in FIG. 4A correspond to the toner images T1 and T2, respectively, in FIG. 3A.

As illustrated in FIG. 4A, in the first exemplary embodiment, the piece of image information GDA is first divided in the LEF direction at a position having a distance equal to the circumference L of the fixing roller 100 (hereinafter may also be simply referred to as a length L) from a side, thereby obtaining pieces of unit image information GD1 and GD2. The length of the recording sheet P1 in the LEF direction is shorter than 2L, and thus the length of the piece of unit image information GD2 is shorter than L.

Next, as illustrated in FIG. 4A, the pieces of unit image information GD1 and GD2 are each divided into a mesh-like shape such that a predetermined number of division areas (cells) are formed. In FIG. 4A, the piece of unit image information GD1 is divided into 6×16 cells and the piece of unit image information GD2 is divided into 4×16 cells. Each cell in the piece of unit image information GD2 is the same as that in the piece of unit image information GD1 in size.

Next, for each cell, one of numerical values that are different from each other is assigned to the cell depending on the presence or absence of an image to be formed. For example, such numerical values are “1” and “0”. That is, in FIG. 4A, 0 is assigned to a cell C1 because there is no image to be formed in the cell C1, and 1 is assigned to a cell C2 because there is an image to be formed in the cell C2.

Here, a threshold may be set in each cell. With the threshold, in the case where there is an image to be formed in part of the cell, 1 is assigned when the image occupies an area of the cell more than or equal to a predetermined size and, otherwise, 0 is assigned. In the following, for each cell, a value assigned to the cell is called an “image value”.

Figure 4B:
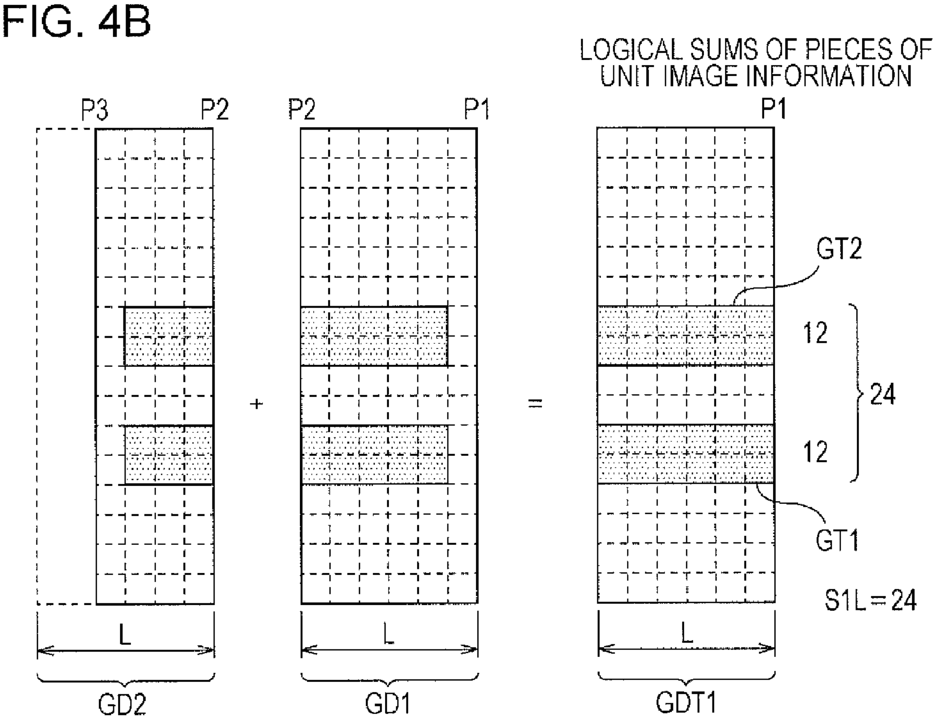

Next, as illustrated in FIG. 4B, logical sums of image values of the cells of the pieces of unit image information GD1 and GD2 are obtained, thereby forming a piece of composite image information GDT1. Each of the logical sums is the logical sum of the image value of a corresponding one of the cells of the piece of unit image information GD1 and the image value of a corresponding one of the cells of the piece of unit image information GD2. As illustrated in FIG. 4B, since the length of the piece of unit image information GD2 is shorter than the length L, the length of the piece of unit image information GD2 may match the length L of the piece of unit image information GD1 by adding cells to which an image value of 0 is assigned. In addition, P1 to P3 in FIG. 4B correspond to P1 to P3 in FIG. 4A.

In FIG. 4B, pieces of composite image information GT1 and GT2 in the piece of composite image information GDT1 correspond to the contact portions TN1 and TN2 of the toner image illustrated in FIG. 3C, respectively. Then, for each of the pieces of composite image information GT1 and GT2, the sum of image values is 12. Thus, in the case where the recording sheet P1 is transported in the LEF direction with respect to the fixing roller 100, an integration image value S1L is calculated as S1L=24.

In the first exemplary embodiment, furthermore, a piece of image information GDB of an image to be printed is divided into a mesh-like shape on the recording sheet P1 arranged to have an orientation corresponding to the SEF direction with respect to the fixing roller 100, and an integration image value S1S is calculated. Similarly to as in the case illustrated in FIGS. 4A and 4B, FIGS. 5A and 5B illustrate a method in which the integration image value S1S is calculated.

Figure 5A:
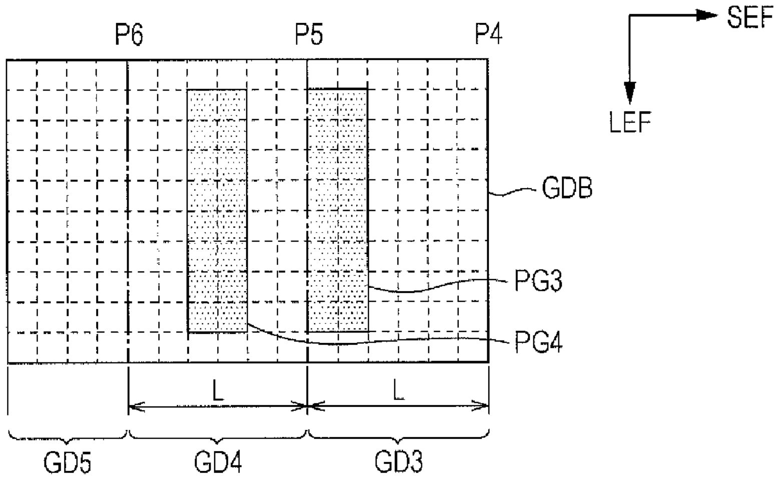
FIGS. 5A and 5B are schematic diagrams illustrating a method for calculating an integration image value in the direction of the shorter side of the recording sheet in the case of the image illustrated in FIGS. 3A to 3F.

Similarly to as in the case illustrated in FIG. 4A, pieces of image information PG3 and PG4 in FIG. 5A correspond to the toner images T1 and T2 in FIG. 3D, respectively.

FIG. 5A illustrates a state in which the piece of image information GDB is divided in the SEF direction at a position having a distance equal to the length L from a side and at a position having a distance equal to a length 2L from the side, thereby obtaining pieces of unit image information GD3, GD4, and GD5. Furthermore, FIG. 5A illustrates a state in which the pieces of unit image information GD3 and GD4 are each divided into a mesh-like shape having 6×10 cells, and the piece of unit image information GD5 is divided into a mesh-like shape having 4×10 cells. Similarly to as in the case illustrated in FIG. 4A, for each cell, an image value of 1 or 0 is assigned to the cell depending on the presence or absence of an image to be formed.

Figure 5B:
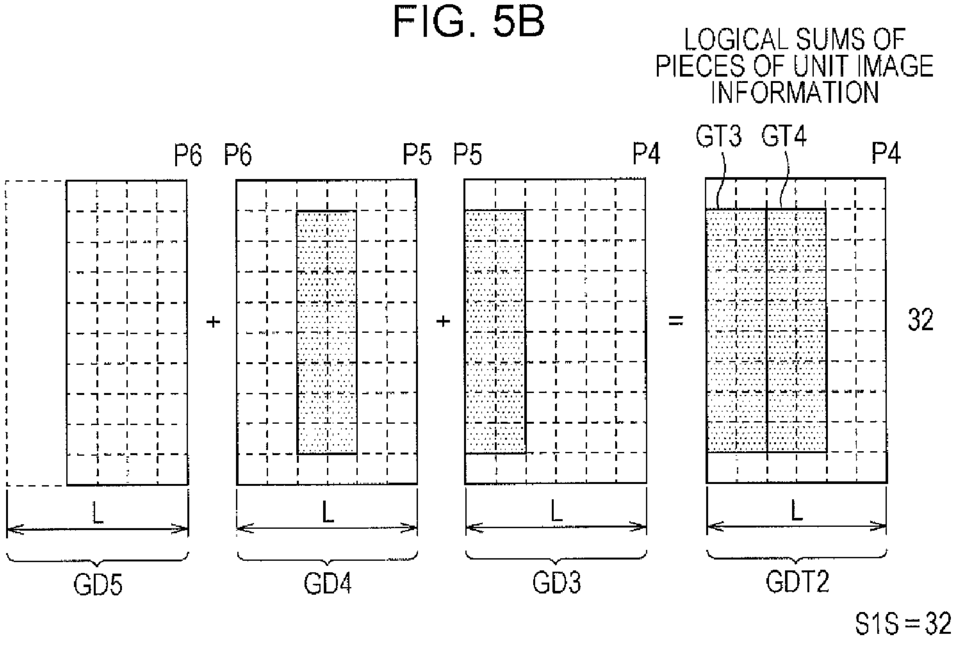

FIG. 5B illustrates a method in which logical sums of image values of the pieces of unit image information GD3 to GD5, similarly to as in the case illustrated in FIG. 4B. Since the length of the piece of unit image information GD5 is shorter than the length L, the length of the piece of unit image information GD5 is made to match the length L by adding cells to which an image value of 0 is assigned.

In FIG. 5B, for each of pieces of composite image information GT3 and GT4 in a piece of composite image information GDT2, the sum of image values is 16. Thus, the integration image value S1S is calculated as S1S=32.

From a result described above, S1L<S1S is obtained. Thus, it is clear that the recording sheet P1 is preferably transported such that the recording sheet P1 has an orientation corresponding to the LEF direction with respect to the fixing roller 100, that is, such that the recording sheet P1 is transported such that the direction of the longer side of the recording sheet P1 matches a direction in which the central axis of the fixing roller 100 extends. This result matches, as a matter of course, in conclusion, a result based on the total contact areas T1L and T1S, which have been considered with reference to FIGS. 3A to 3F, that is, T1L<T1S.

The following will describe, with reference to FIGS. 6A to 8B, a case where the orientation of a recording sheet is determined on the basis of examples of a recording sheet on which another image is printed and pieces of image information for the recording sheet.

Figures 6A, 6B, 6C, 6D, 6E, 6F:
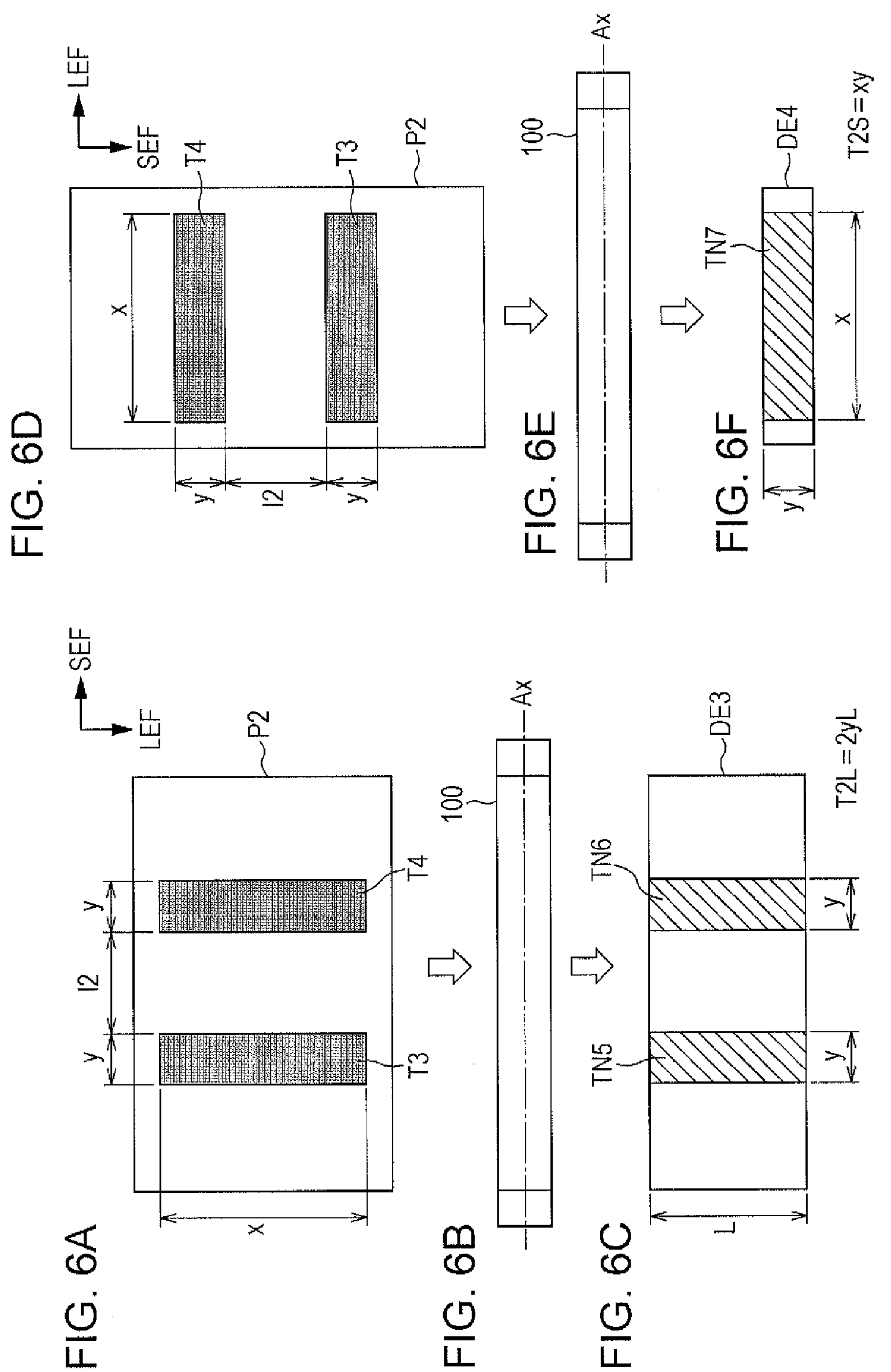
FIGS. 6A to 6F are plan views illustrating another example of a contact state of the fixing roller and toner images according to the first exemplary embodiment.

In FIGS. 6A and 6D, toner images T3 and T4 having a length of x and a width of y, similarly to those in FIGS. 3A and 3D, are arranged and spaced apart from each other by a distance l2, which is different from the distance l1 in FIGS. 3A and 3D, on a recording sheet P2.

Then, FIG. 6C illustrates contact portions TN5 and TN6 of toner images on an expansion plan DE3 of the fixing roller 100, in the case where the recording sheet P2 is transported such that the recording sheet P2 has an orientation corresponding to the LEF direction with respect to the fixing roller 100. The contact portions TN5 and TN6 of the toner images each have a rectangular shape having a width of y and a length of L, similarly to the contact portions TN1 and TN2 illustrated in FIG. 3C.

FIG. 6F illustrates a contact portion TN7 of the toner images on an expansion plan DE4 of the fixing roller 100, in the case where the recording sheet P2 is transported such that the recording sheet P2 has an orientation corresponding to the SEF direction with respect to the fixing roller 100. The contact portion TN7 in the case of this example differs from the contact portions TN3 and TN4 illustrated in FIG. 3F in that the contact portion TN7 is a contact portion having a single rectangular shape. That is, the distance l2 between the toner images T3 and T4 is equal to the circumference L of the fixing roller 100. This means that when the toner image T3 performs one rotation, the toner image T4 overlies the toner image T3.

As illustrated in FIG. 6C, in the case where the recording sheet P2 has an orientation corresponding to the LEF direction, a total contact area T2L is T2L=2yL. In addition, as illustrated in FIG. 6F, in the case where the recording sheet P2 has an orientation corresponding to the SEF direction, a total contact area T2S is T2S=xy. Thus, on the basis of the above-described assumption x<2L, T2L>T2S is obtained. Thus, with respect to the fixing roller 100, the recording sheet P2 is transported such that the recording sheet P2 has an orientation corresponding to the SEF direction. This result is different from the result obtained with reference to FIGS. 3A to 3F. Even when recording sheets having similar toner images are used, a total contact area varies depending on the positions of toner images on the recording sheets. Therefore, the orientation of the recording sheet to be transported with respect to the fixing roller 100 also varies.

Figure 7A:
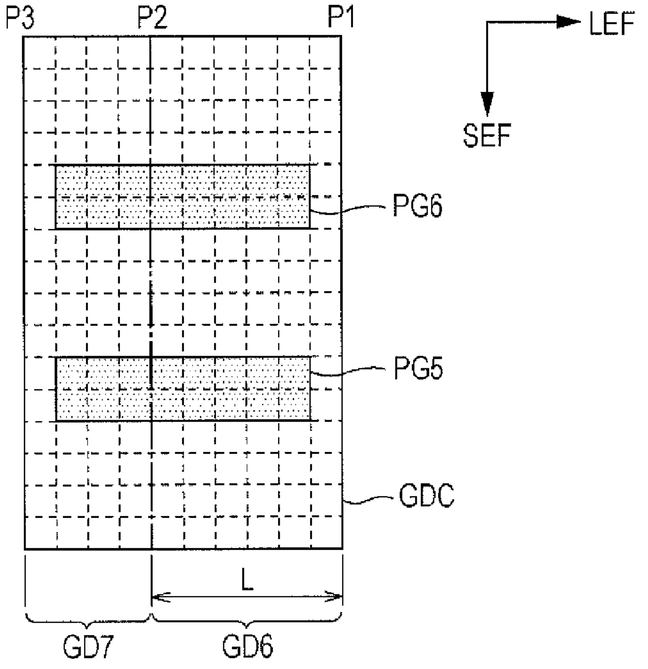
FIGS. 7A and 7B are schematic diagrams illustrating a method for calculating an integration image value in the direction of the longer side of a recording sheet in the case of an image illustrated in FIGS. 6A to 6F.
Figure 7B:
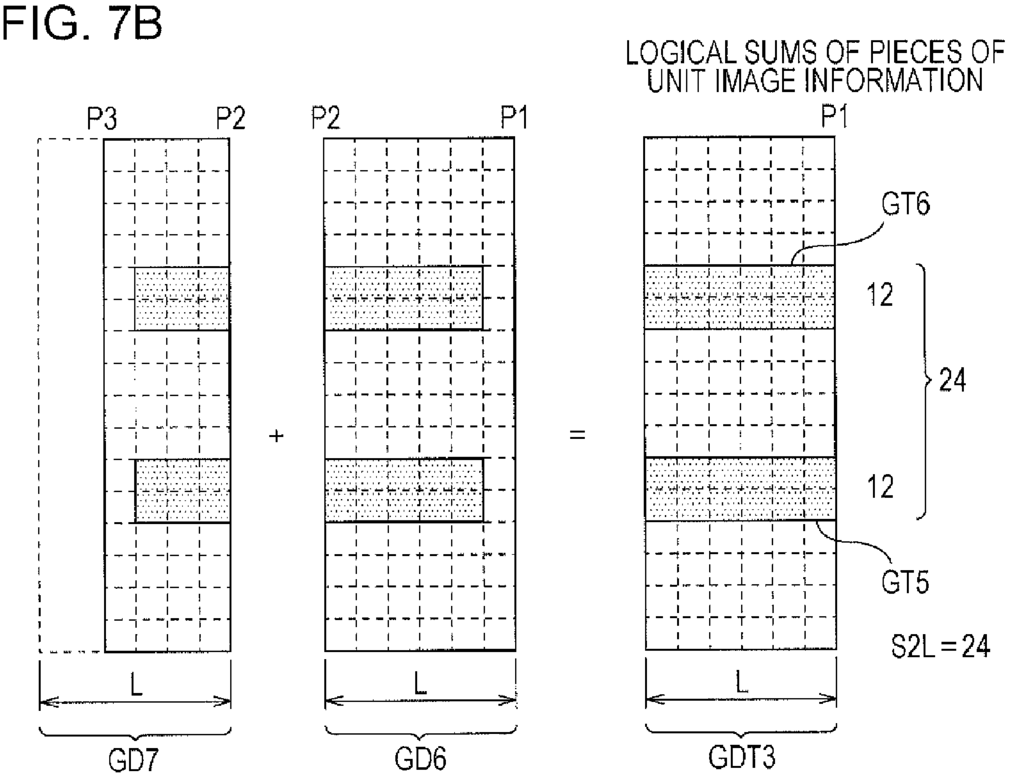
Figure 8A:
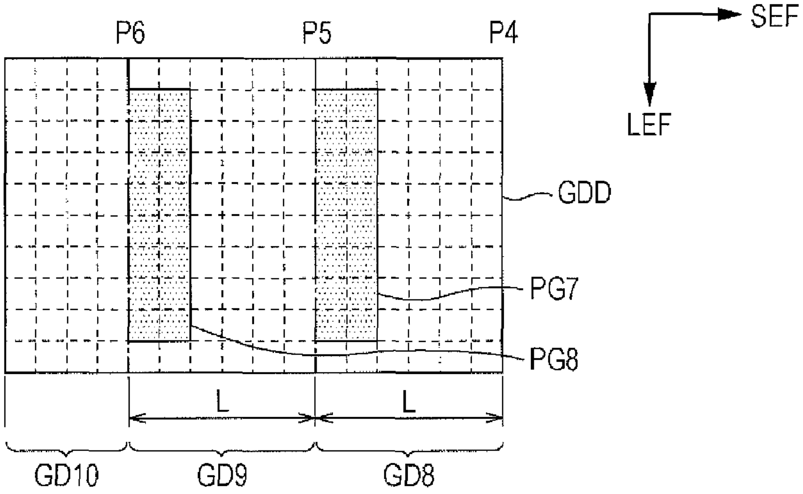
FIGS. 8A and 8B are schematic diagrams illustrating a method for calculating an integration image value in the direction of the shorter side of the recording sheet in the case of the image illustrated in FIGS. 6A to 6F.
Figure 8B:
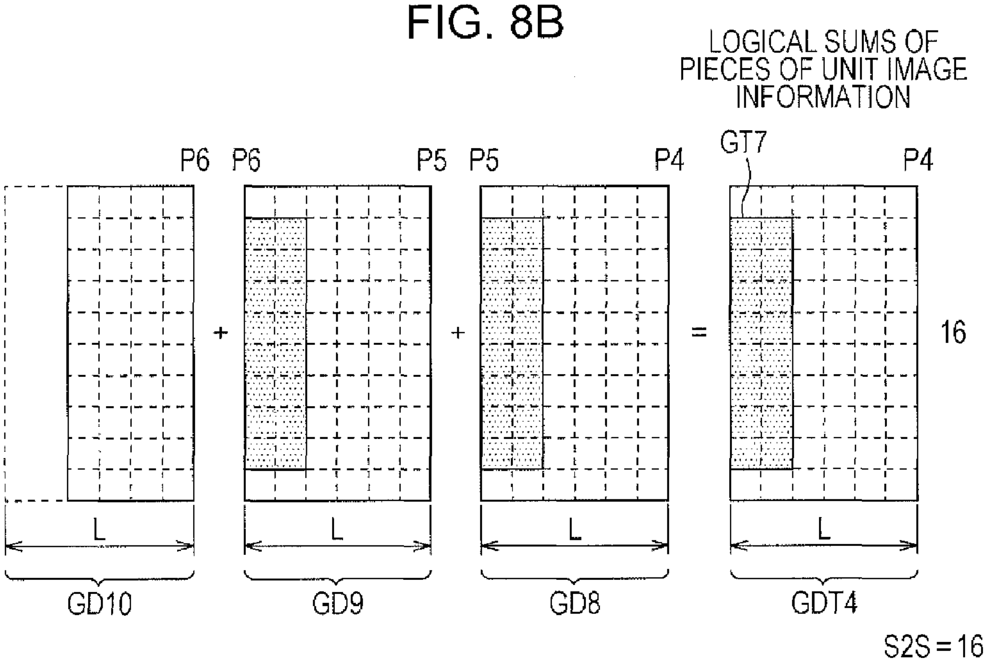

FIGS. 7A and 7B schematically illustrate a method in which, similarly to as in the case illustrated in FIGS. 4A and 4B, an integration image value S2L is obtained in the case where the recording sheet P2 is transported such that the recording sheet P2 has an orientation corresponding to the LEF direction. FIGS. 8A and 8B schematically illustrate a method in which, similarly to as in the case illustrated in FIGS. 5A and 5B, an integration image value S2S is obtained in the case where the recording sheet P2 is transported such that the recording sheet P2 has an orientation corresponding to the SEF direction. Pieces of image information PG5 and PG6 in FIG. 7A and pieces of image information PG7 and PG8 in FIG. 8A correspond to the toner images T3 and T4 in FIGS. 6A and 6D.

Specifically, as illustrated in FIG. 7A, a piece of image information GDC is divided at a position having a distance equal to the circumference L of the fixing roller 100 from a side, thereby obtaining pieces of unit image information GD6 and GD7. Furthermore, the pieces of unit image information GD6 and GD7 are each divided into a mesh-like shape and, for each cell, an image value of 1 or 0 is assigned to the cell depending on the presence or absence of an image to be formed. Then, as illustrated in FIG. 7B, logical sums of image values of the pieces of unit image information GD6 and GD7 are obtained, thereby forming a piece of composite image information GDT3. The integration image value S2L is calculated on the basis of the piece of composite image information GDT3. In this case, the length of the piece of unit image information GD7 may match the length L by adding cells to which an image value of 0 is assigned.

In addition, as illustrated in FIG. 8A, a piece of image information GDD is divided at positions having a distance equal to the circumference L of the fixing roller 100 and a distance equal to a length 2L from a side, thereby obtaining pieces of unit image information GD8 to GD10. Furthermore, the pieces of unit image information GD8 to GD10 are each divided into a mesh-like shape and, for each cell, an image value of 1 or 0 is assigned to the cell depending on the presence or absence of an image to be formed. Then, as illustrated in FIG. 8B, logical sums of image values of the pieces of unit image information GD8 to GD10 are obtained, thereby forming a piece of composite image information GDT4. The integration image value S2S is calculated on the basis of the piece of composite image information GDT4. In this case, the length of the piece of unit image information GD10 may match the length L by adding cells to which an image value of 0 is assigned.

With reference to FIG. 7B, in the case where the recording sheet P2 is transported such that the recording sheet P2 has an orientation corresponding to the LEF direction, the integration image value S2L is calculated as S2L=24 from the sum of the pieces of composite image information GT5 and GT6. In contrast, in the case where the recording sheet P2 is transported such that the recording sheet P2 has an orientation corresponding to the SEF direction, the integration image value S2S is calculated as S2S=16 from the piece of composite image information GT7. Since S2S<S2L is obtained, it is clear that, in the case of the recording sheet P2 on which the toner images T3 and T4 have been formed, the recording sheet P2 is preferably transported such that the recording sheet P2 has an orientation corresponding to the SEF direction, that is, the direction of the shorter side of the recording sheet P2 matches a direction in which the central axis of the fixing roller 100 extends.

This result is opposite to the result in the case of the recording sheet P1 illustrated in FIGS. 3A to 3F, the recording sheets P1 and P2 having the same toner images (the toner images T1 and T2 illustrated in FIG. 3A or 3D and the toner images T3 and T4 illustrated in FIG. 6A or 6D). In addition, as a matter of course, in conclusion, this result matches a result T2S<T2L, which is a result based on the total contact areas T2S and T2L, which have been considered with reference to FIGS. 6A to 6F.

Next, with reference to FIG. 9, operation of the image forming apparatus 10 according to the first exemplary embodiment will be described.

Figure 9:
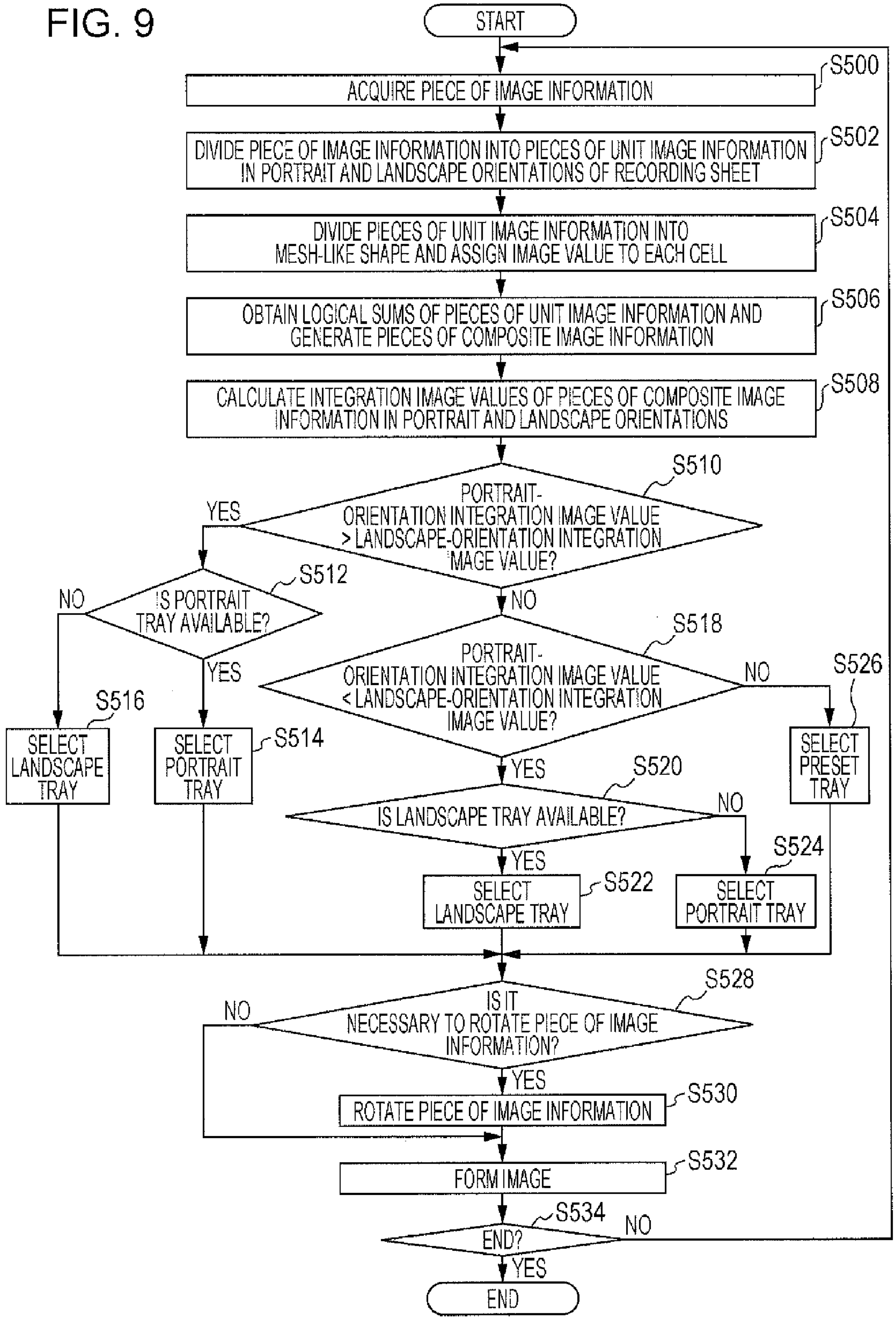
FIG. 9 is a flowchart illustrating the flow of processing of an image forming processing program according to the first exemplary embodiment.

FIG. 9 is a flowchart illustrating the flow of processing of an image forming processing program according to the first exemplary embodiment. In this manner, in the first exemplary embodiment, this image forming processing is realized by a software configuration using a computer that executes a program; however, the way in which this image forming processing is realized is not limited thereto. For example, this image forming processing may also by realized by a hardware configuration using an application-specific integrated circuit (ASIC) or a combination of a hardware configuration and a software configuration.

In the following, a case will be described where the image forming apparatus 10 according to the first exemplary embodiment executes the above-described program and determines the orientation of a recording sheet. In this case, the program may be installed in advance in the ROM 62, may be provided as a computer readable storage medium in which the program is stored, may be distributed via a communication unit in a wired or a wireless manner, or the like.

Note that, in order to avoid confusion in the following, suppose that a document or the like to be printed has already been set in the scanner unit 30 and an execution instruction of the image forming processing program has been input by a user through the UI panel 68 or the like. In addition, image processing such as mesh division in the image forming processing program is performed, for example, by the image processing unit 32 via the CPU 60.

In addition, in FIG. 9, the orientation of a recording sheet corresponding to the SEF direction (the direction of the shorter side) is referred to as a portrait orientation, and that of a recording sheet corresponding to the LEF direction (the direction of the longer side) is referred to as a landscape orientation.

In FIG. 9, first, in step S500, a piece of image information of an image to be printed is acquired, for example, by the scanner unit 30 reading a document or the like. The acquired piece of image information is stored, for example, in a storage unit such as the RAM 64 or a hard disk drive (HDD), which is not illustrated.

Next, in step S502, the piece of image information is divided into pieces of unit image information in the portrait orientation, and is also divided into pieces of unit image information in the landscape orientation.

Next, in step S504, the pieces of unit image information are divided into a mesh-like shape having cells the size of which is predetermined, and, for each cell, an image value of 1 or 0 is assigned to the cell (see FIGS. 4A, 5A, 7A, and 8A).

Here, in FIGS. 4A, 5A, 7A, and 8A, the cases where the pieces of unit image information are divided into 6×16 cells have been described as examples; however, the number of cells is not limited thereto. The number of partitions may be arbitrarily set in accordance with desired determination accuracy or the like of the orientation of a recording sheet. The more number of partitions is set, the more accurately the orientation of a recording sheet is determined.

Next, in step S506, a piece of composite image information is generated by obtaining logical sums of image values of pieces of unit image information.

Next, in step S508, an integration image value obtained by integrating image values of the composite image information in the portrait orientation and an integration image value obtained by integrating image values of the piece of composite image information in the landscape orientation are calculated (see FIGS. 4B, 5B, 7B, and 8B). Note that, in the following, the integration image value obtained in the SEF direction is called a portrait-orientation integration image value, and the integration image value obtained in the LEF direction is called a landscape-orientation integration image value.

Next, in step S510, it is determined whether or not the portrait-orientation integration image value is greater than the landscape-orientation integration image value. When YES is obtained, the procedure proceeds to step S512. When NO is obtained, the procedure proceeds to step S518, which will be described later.

In step S512, it is determined whether or not the Portrait Tray (the sheet tray 74B) is available (whether or not recording sheets are stacked in the Portrait Tray). When YES is obtained, the procedure proceeds to step S514 and the Portrait Tray (the sheet tray 74B) is selected. When NO is obtained, the procedure proceeds to step S516 and the Landscape Tray (the sheet tray 74A) is selected.

In step S518, it is determined whether or not the portrait-orientation integration image value is smaller than the landscape-orientation integration image value. When YES is obtained, the procedure proceeds to step S520. When NO is obtained, the procedure proceeds to step S526, which will be described later.

In step S520, it is determined whether or not the Landscape Tray (the sheet tray 74A) is available (whether or not recording sheets are stacked in the Landscape Tray). When YES is obtained, the procedure proceeds to step S522 and the Landscape Tray (the sheet tray 74A) is selected. When NO is obtained, the procedure proceeds to step S524 and the Portrait Tray (the sheet tray 74B) is selected.

In contrast, in step S526, a sheet tray set for the image forming apparatus 10 at this point in time (the sheet tray 74A or the sheet tray 74B) is selected. This is because, in the case where the portrait-orientation integration image value is equal to the landscape-orientation integration image value, there is no difference in terms of contact between the fixing roller 100 and toner images regardless of any of the sheet trays being selected.

Note that the sheet tray set for the image forming apparatus 10 at this point in time is, for example, a sheet tray set for the image forming apparatus 10 in advance or a sheet tray set to be selected when a user does not perform selection.

Next, in step S528, it is determined whether or not it is necessary to rotate a piece of image information (for example, the pieces of image information GDA to GDD). When NO is obtained, the procedure proceeds to step S532, which will be described later. When YES is obtained, the procedure proceeds to step S530 and the piece of image information is rotated by 90°.

Here, the reason why whether or not rotation of the piece of image information is necessary is determined in step S528 is that, depending on the orientation of recording sheets stacked in the selected sheet tray, the orientation of an image to be printed differs from that of an image set in the image processing unit 32 by 90°. That is, step S528 is processing for causing the orientation of an image to be printed to match the orientation of recording sheets stacked in the selected sheet tray.

Next, in step S532, an image is formed by controlling the image forming unit 48 on a recording sheet transported from the selected sheet tray. That is, printing is executed.

Next, in step S534, it is determined whether or not it is a timing at which the image forming processing program ends. When NO is obtained, the procedure returns to step S500. At a timing at which YES is obtained, the image forming processing program ends.

Note that, for example, the time when printing of a set document or the like on recording sheets is completed may be a timing at which the image forming processing program ends, the number of the recording sheets having been specified by a user through the UI panel 68 or the like.

As described above, according to the image forming apparatus 10 according to the first exemplary embodiment, the orientation of a recording sheet in which a total contact area, which is an area that contacts the fixing roller 100 and toner images, is smaller is determined by obtaining integration image values for orientations of the recording sheet, and a recording sheet is transported such that the recording sheet has an orientation corresponding to the direction corresponding to the smaller integration image value with respect to the fixing roller 100.

Second Exemplary Embodiment

Figure 10:
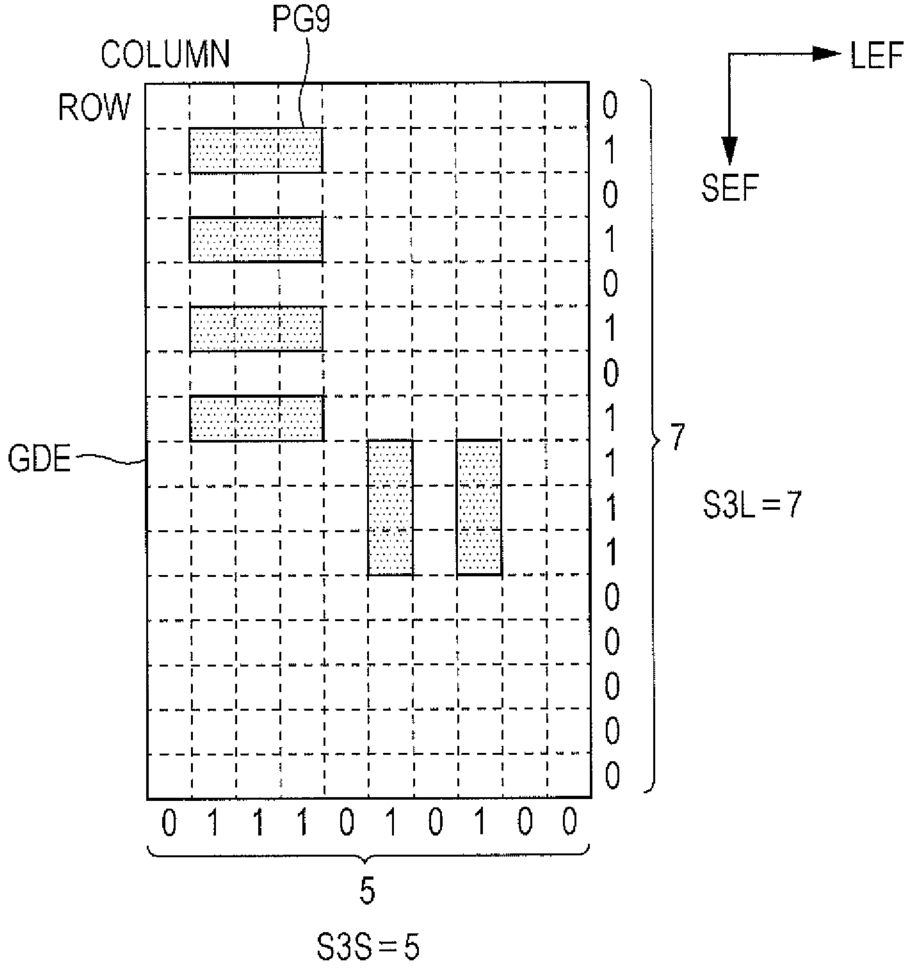
FIG. 10 is a schematic diagram illustrating a method for calculating an integration image value according to a second exemplary embodiment.
Figure 11:
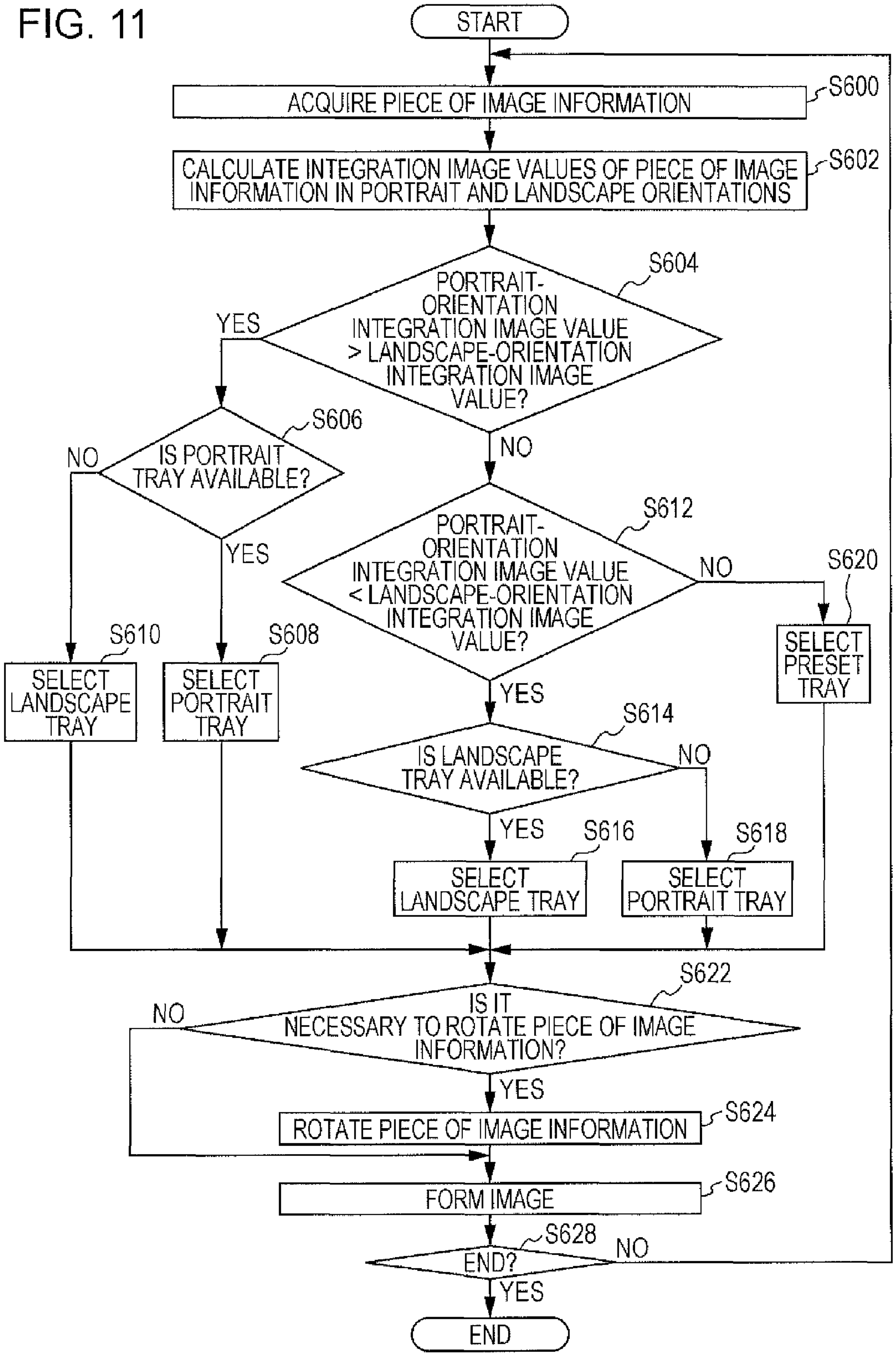
FIG. 11 is a flowchart illustrating the flow of processing of an image forming processing program according to the second exemplary embodiment.

With reference to FIGS. 10 and 11, the image forming apparatus 10 according to a second exemplary embodiment will be described. A method for calculating an integration image value in the second exemplary embodiment is more simplified than that in the first exemplary embodiment.

FIG. 10 illustrates a schematic diagram of a method for calculating an integration image value according to the second exemplary embodiment. With reference to FIG. 10, a method for calculating an integration image value according to the second exemplary embodiment is described using a piece of image information GDE that includes a piece of image information PG9 of six line-shaped images.

In the second exemplary embodiment, the piece of image information GDE is divided into a mesh-like shape having plural division areas (cells). The number of cells is not specially limited; however, in FIG. 10, the piece of image information GDE is divided into 10×16 cells. Similarly to as in the first exemplary embodiment, for each cell, an image value of 1 or 0 is assigned to the cell depending on the presence or absence of an image to be formed.

Then, in both the SEF direction and the LEF direction, logical sums of image values of cells are obtained, and thereafter these logical sums are added. Here, in FIG. 10, regions obtained by dividing the piece of image information GDE, when viewed horizontally, along the SEF direction are called rows, and regions obtained by dividing the piece of image information GDE, when viewed vertically, along the LEF direction are called columns. In the second exemplary embodiment, the width of one row and the width of one column are each equal to the circumference L of the fixing roller 100.

In the case where an integration image value is obtained in the SEF direction, for each column, a logical sum of image values of the cells of the column is first obtained as illustrated in FIG. 10. In FIG. 10, logical sums are (0, 1, 1, 1, 0, 1, 0, 1, 0, 0) from the leftmost column. Next, the logical sums of these image values are added and used as an integration image value S3S for the SEF direction. In the example illustrated in FIG. 10, S3S=5.

Next, in the case where an integration image value is obtained in the LEF direction, for each row, a logical sum of image values of the cells of the row is first obtained as illustrated in FIG. 10. In FIG. 10, logical sums are (0, 1, 0, 1, 0, 1, 0, 1, 1, 1, 1, 0, 0, 0, 0, 0) from the topmost row. Next, the logical sums of these image values are added and used as an integration image value S3L for the LEF direction. In the example illustrated in FIG. 10, S3L=7.

In the example of FIG. 10, since S3S<S3L is obtained, the area that contacts the peripheral surface of the fixing roller 100 and toner images is considered to be smaller when a recording sheet is transported in in the SEF direction with respect to the fixing roller 100. Thus, the orientation corresponding to the SEF direction is selected as the orientation of a recording sheet to be transported with respect to the fixing roller 100. That is, the recording sheet is transported such that the direction of the shorter side of the recording sheet matches a direction in which the central axis of the fixing roller 100 extends.

Next, with reference to FIG. 11, operation of the image forming apparatus 10 according to the second exemplary embodiment will be described. FIG. 11 is a flowchart illustrating the flow of processing of an image forming processing program according to the second exemplary embodiment. Suppose that, similarly to as in the case illustrated in FIG. 9, a document or the like to be printed has also already been set in the scanner unit 30 and an execution instruction of the image forming processing program has also been input by a user through the UI panel 68 or the like in the second exemplary embodiment. In addition, also in the case illustrated in FIG. 11, the orientation of a recording sheet corresponding to the SEF direction (the direction of the shorter side) is referred to as a portrait orientation, and that of a recording sheet corresponding to the LEF direction (the direction of the longer side) is referred to as a landscape orientation.

In FIG. 11, in step S600, a piece of image information (denoted by GDE in FIG. 10) of an image to be printed is acquired by the scanner unit 30, for example, reading a document or the like. The acquired piece of image information is stored, for example, in a storage unit such as the RAM 64 or a hard disk drive (HDD), which is not illustrated.

Next, in step S602, integration image values (denoted by S3S and S3L in FIG. 10) for longitudinal and lateral directions are calculated using the above-described method.

Steps S604 to S628 are similar to steps S510 to S534 in FIG. 9, and thus a description thereof will be omitted.

As described above, according to the image forming apparatus 10 according to the second exemplary embodiment, the orientation of a recording sheet in which a total contact area is smaller is determined by obtaining integration image values for orientations of the recording sheet, the total contact area being an area that contacts the fixing roller 100 and toner images. The recording sheet is transported such that the recording sheet has an orientation corresponding to the direction corresponding to the smaller integration image value with respect to the fixing roller 100.

In addition, according to the image forming apparatus 10 according to the second exemplary embodiment, processing is simpler than that performed in the first exemplary embodiment. Thus, the load of control processing performed by the CPU 60 or the like may be reduced.

Note that, each of the above-described exemplary embodiments describes as an example that a piece of image information corresponding to a recording sheet is divided into a mesh-like shape having plural cells and, for each cell, an image value of 1 or 0 is assigned to the cell depending on the presence or absence of an image to be formed. However, exemplary embodiments of the present invention are not limited thereto. For example, pixel data of image information corresponding to a recording sheet may be used instead of cells and, for each of the orientations of a recording sheet with respect to a fixing roller, an integration image value for the orientation may be calculated on the basis of the pixel data.

In addition, in each of the above-described exemplary embodiments, the orientation of a recording sheet to be transported to the fixing roller 100 is selected by selecting either of two sheet trays, in which recording sheets are stacked and the orientations of sheets stacked in the two sheet trays differ from each other by 90°. However, exemplary embodiments of the present invention are not limited these. For example, a single sheet tray is used and the orientation of a sheet may be selected by a mechanism that rotates a recording sheet by 90°, the mechanism being provided in an image forming apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a toner image forming unit forming a toner image; and a fixing unit rotating around a central axis extending in a first direction, the fixing unit including a surface fixing the toner image formed based on image information to form the toner image in a rectangular region of a recording medium and transporting the recording medium in a second direction that is perpendicular to the first direction by contacting the recording medium, the toner image forming unit including:

a selecting unit selecting an image formation corresponding to an orientation having a smallest integration value selected from a first integration value and a second integration value, the first integration value being integration values of an area of a portion of the surface of the fixing unit that first contacts the toner image when a side of the rectangular region is parallel to the first direction, when fixing is performed, and the second integration value being integration values of an area of a portion of the surface of the fixing unit that first contacts the toner image when the side of the rectangular region is perpendicular to a second direction, when fixing is performed, wherein the circumference of the surface in a rotation direction is shorter than at least one of the length of the toner image in the first direction and the length of the toner image in the second direction, and the selecting unit divides, using the circumference, a piece of image information representing the toner image into a plurality of pieces of unit image information in the first direction and the second direction, divides each of the plurality of pieces of unit image information into a grid that forms a plurality of division areas to each of which one of different values is assigned depending on the presence or absence of an image to be formed, obtains the integration values by obtaining logical sums of division areas of the plurality of pieces of unit image information along each of the first direction and the second direction, and selects an image formation corresponding to an orientation that corresponds to a smallest one of the integration values, each of the logical sums being obtained from corresponding ones of the division areas of the plurality of pieces of unit image information.

2. A non-transitory computer readable medium storing a program causing a computer to function as: the image forming apparatus according to claim 1.

3. The image forming apparatus according to claim 1, wherein the selecting unit does not integrate the first integration value and the second integration value repeatedly when a portion of the surface of the fixing unit is contacted a plurality of times by the toner image.

4. The image forming apparatus according to claim 1, wherein at least one of the first integration value and the second integration value is calculated by a logical sum.

5. The image forming apparatus according to claim 1, further comprising:

a switching unit that switches an orientation of the recording medium transported to the fixing unit according to a selection by the selecting unit.

6. The image forming apparatus according to claim 5, further comprising:

a first holding unit that holds the recording medium such that the recording medium is supplied in the orientation corresponding to the first direction with respect to the fixing unit; and a second holding unit that holds the recording medium such that the recording medium is supplied in the orientation corresponding to the second direction with respect to the fixing unit, wherein the switching unit performs switching by selecting either of the first holding unit and the second holding unit.

7. A non-transitory computer readable medium storing a program causing a computer to function as: the image forming apparatus according to claim 6.

8. An image forming method comprising:

forming a toner image;

rotating a fixing unit around a central axis extending in a first direction, the fixing unit including a surface fixing the toner image formed based on image information to form the toner image in a rectangular region of a recording medium and transporting the recording medium in a second direction that is perpendicular to the first direction by contacting the recording medium;

selecting an image formation corresponding to an orientation having a smallest integration value selected from a first integration value and a second integration value, the first integration value being integration values of an area of a portion of the surface of the fixing unit that first contacts the toner image when a side of the rectangular region is parallel to the first direction, when fixing is performed, and the second integration value being integration values of an area of a portion of the surface of the fixing unit that first contacts the toner image when the side of the rectangular region is perpendicular to a second direction, when fixing is performed, wherein the circumference of the surface in a rotation direction is shorter than at least one of the length of the toner image in the first direction and the length of the toner image in the second direction;

dividing, using the circumference, a piece of image information representing the toner image into a plurality of pieces of unit image information in the first direction and the second direction;

dividing each of the plurality of pieces of unit image information into a grid that forms a plurality of division areas to each of which one of different values is assigned depending on the presence or absence of an image to be formed;

obtaining the integration values by obtaining logical sums of division areas of the plurality of pieces of unit image information along each of the first direction and the second direction; and selecting an image formation corresponding to an orientation that corresponds to a smallest one of the integration values, each of the logical sums being obtained from corresponding ones of the division areas of the plurality of pieces of unit image information.

9. An image forming apparatus comprising:

a rotating fixing unit that has a surface, the surface fixing a toner image on a recording medium, which is being transported, by contacting the recording medium;

a switching unit that switches between transportation directions in which the recording sheet is transported such that an orientation of a predetermined side of the recording medium with respect to the fixing unit matches either an orientation corresponding to a first direction in which the central axis of the fixing unit extends or an orientation corresponding to a second direction that is perpendicular to the first direction; and a control unit that controls the switching unit such that the recording medium is transported in a direction corresponding to a smallest one of integration values obtained along the first direction and the second direction, the integration values being integration values of an area of a portion of the surface of the rotating fixing unit that first contacts a toner image when fixing is performed, wherein the circumference of the surface in a rotation direction is shorter than at least one of the length of the toner image in the first direction and the length of the toner image in the second direction, and the control unit divides, using the circumference, a piece of image information representing the toner image into a plurality of pieces of unit image information in the first direction and the second direction, divides each of the plurality of pieces of unit image information into a grid that forms a plurality of division areas to each of which one of different values is assigned depending on the presence or absence of an image to be formed, obtains the integration values by obtaining logical sums of division areas of the plurality of pieces of unit image information along each of the first direction and the second direction, and controls the switching unit such that the recording medium is transported in a direction corresponding to a smallest one of the integration values, each of the logical sums being obtained from corresponding ones of the division areas of the plurality of pieces of unit image information.

10. The image forming apparatus according to claim 9, further comprising:

a first holding unit that holds the recording medium such that the recording medium is supplied in the orientation corresponding to the first direction with respect to the fixing unit; and a second holding unit that holds the recording medium such that the recording medium is supplied in the orientation corresponding to the second direction with respect to the fixing unit, wherein the switching unit performs switching by selecting either of the first holding unit and the second holding unit.

11. A non-transitory computer readable medium storing a program causing a computer to function as: the image forming apparatus according to claim 10.

12. A non-transitory computer readable medium storing a program causing a computer to function as: the image forming apparatus according to claim 9.

* * * * *